US007003223B2

(12) United States Patent
Sasaki et al.

(10) Patent No.: US 7,003,223 B2
(45) Date of Patent: Feb. 21, 2006

(54) LENS CONTROL SYSTEM AND FOCUS INFORMATION DISPLAY APPARATUS

(75) Inventors: Tadashi Sasaki, Saitama (JP); Keiji Kaneko, Saitama (JP); Syunichiro Ouchi, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/780,740

(22) Filed: Feb. 19, 2004

(65) Prior Publication Data

US 2004/0165879 A1 Aug. 26, 2004

(30) Foreign Application Priority Data

Feb. 24, 2003 (JP) ............................ 2003-045690
Mar. 24, 2003 (JP) ............................ 2003-080326

(51) Int. Cl.
*G03B 13/34* (2006.01)

(52) U.S. Cl. ...................................... 396/103; 396/147

(58) Field of Classification Search ................ 396/103, 396/138, 147, 294, 131; 348/346; 352/140
See application file for complete search history.

(56) References Cited

U.S. PATENT DOCUMENTS 6,148,151 A * 11/2000 Bauer .......................... 396/56
2003/0011692 A1* 1/2003 Shore et al. ............. 348/240.3

FOREIGN PATENT DOCUMENTS

JP 63287937 11/1998
JP 2003-066304 3/2003

* cited by examiner

*Primary Examiner*—W. B. Perkey
(74) *Attorney, Agent, or Firm*—Harness, Dickey & Pierce, P.L.C.

(57) ABSTRACT

A screen of a display of a photographing system shows a distance scale indicating a present focus position and an indicator. The screen also shows a focus position already obtained by auto focusing, using a mark.

18 Claims, 9 Drawing Sheets

LENS CONTROL SYSTEM AND FOCUS INFORMATION DISPLAY APPARATUS

BACKGROUND OF THE INVENTION

1. Field of the Invention

The present invention relates to a lens control system, and in particular, to a lens control system capable of auto focusing and manual focusing.

The present invention also relates to a focus information display apparatus, and in particular, to a focus information display apparatus that displays a pre-stored desired focus position for reference during a focus operation.

2. Description of the Related Art

In general, in film making, manual focus operations are performed in order to intentionally perform focus operations during photographing and to reliably focus on a desired subject (refer to, for example, Japanese Patent Application Publication No. 63-287937). Furthermore, test photographing is carried out before actual photographing in order to check and set photographing conditions for a camera and a photographing lens. At this time, a focus position for the actual photographing is checked so as to be reflected in the actual photographing. For example, if during the actual photographing, the focus is manually operated to change the subject to be focused while continuing the photographing, then during the test photographing, a manual operation member (for example, a focus ring) is operated to sequentially focus on the subjects. Then, the operated position of the focus ring obtained when each subject is focused is marked by, for example, applying a tape or the like to the focus ring. During the actual photographing, the focus ring is operated by referencing these markings to reproduce the focus positions adjusted to the respective subjects during the test photographing (refer to, for example, Japanese Patent Application Publication No. 2003-66304).

However, the above method requires much time and labor for marking operations. In particular, the marking with tapes or the like is not sufficiently accurate and it is also difficult to accurately align the manual operation member to the marked positions. Thus, disadvantageously, the focus positions obtained during the test photographing cannot be accurately reproduced during the actual photographing.

Furthermore, manual operations are limited in the accuracy with which the subjects are focused during the test photographing. In particular, during the test photographing, special attention need not be paid to focus operations during focusing, so that an auto focus function capable of accurate focusing can be used. However, in the prior art, the auto focus function is not utilized even during the test photographing.

SUMMARY OF THE INVENTION

The present invention is provided in view of these circumstances. It is an object of the present invention to provide a lens control system that enables an accurate focus position already obtained using an auto focus function to be easily reproduced using a manual focus function.

It is another object of the present invention to provide a focus information display device that enables a pre-stored focus position to be easily and accurately reproduced.

To accomplish the object, a first aspect of the present invention provides a lens control system having an auto focus device which drives a focus of a photographing lens for automatic focusing and a manual focus device which drives the focus of the photographing lens by manually operating a predetermined operation member, the system comprising: an instructing device which instructs on recording of the focus position set by focusing executed by the auto focus device; and a focus recording position display device which displays the focus position the recording of which has been instructed on by the instructing device so that the focus position can be referenced when the manual focus device executes focusing.

A second aspect of the present invention is the lens control system according to first aspect of the present invention, characterized in that the focus recording position display device displays on a display screen that displays a present focus position, the focus position the recording of which has been instructed on by the instructing device and the present focus position so that it can be determined whether or not these focus positions are matched.

According to the present invention, the focus position obtained using the auto focus function is recorded in accordance with the instruction from the predetermined instructing device. Then, this position is displayed on the predetermined display device during focusing using the manual focus function. Consequently, the focus position obtained using the auto focus function can be easily reproduced during the focusing using the manual focus function. Therefore, if the present invention is used for a lens control system for film making, it is possible to accurately focus on a predetermined subject during test photographing using the auto focus function and then to easily reproduce, during actual photographing, the focus position obtained during the test photographing by manual focusing. The present invention is thus suitable for such a lens control system.

To accomplish the above object, a third aspect of the present invention provides a focus information display apparatus which displays information on a focus of a photographing lens, the apparatus comprising: a focus position storage device which stores a desired focus position of the photographing lens or a focus operation signal as a focus stored position; a focus present position acquiring device which acquires a present focus position or a focus operation signal as a focus present position; and a display device which displays information indicating how the focus present position and the focus stored position are close to each other.

A fourth aspect of the present invention is the focus information display apparatus according to the third aspect of the present invention, characterized in that the display device changes a display state of a predetermined character, symbol, or graphic when a difference between a value indicative of the focus present position and a value indicative of the focus stored position is smaller than a predetermined threshold.

A fifth aspect of the present invention is the focus information display apparatus according to the fourth aspect of the present invention, characterized in that the threshold is set on the basis of a focal depth or a depth of field of the photographing lens.

According to the present invention, the display state of the predetermined character, symbol, or graphic is changed to provide the information indicating how the pre-stored focus present position (focus stored position) and the present focus position (focus present position) are close to each other. The pre-stored focus position can be reproduced easily and accurately.

DETAILED DESCRIPTION OF THE PREFERRED EMBODIMENTS (First Embodiment)

With reference to the accompanying drawings, a detailed description will be given of a preferred embodiment of a lens control system according to the present invention.

Figure 1:
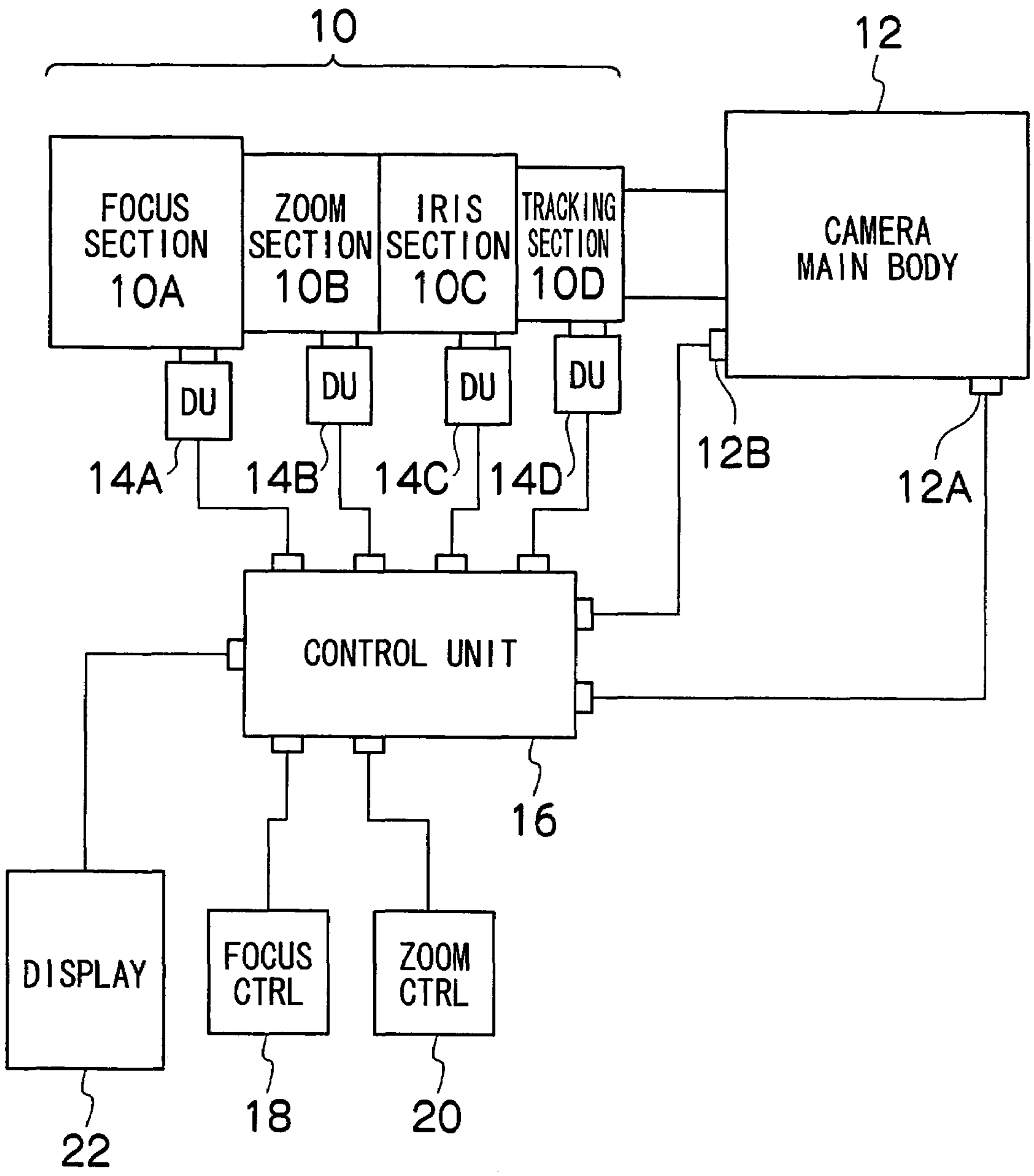
FIG. 1 is a block diagram showing the configuration of a photographing system according to a first embodiment of the present invention.

FIG. 1 is a block diagram showing the configuration of a photographing system for motion pictures to which the present invention is applied. The photographing system according to the present embodiment is suitable for film making.

In FIG. 1, a photographing lens (optical system) 10 is installed on a camera main body 12 using a mount, with a photographing element, a video signal processing circuit, and the like mounted on the camera main body. The photographing lens 10 is divided into a focus section 10A, a zoom section 10B, an iris section 10C, and a tracking section 10D in association with the types of movable optical parts arranged in a lens barrel. A group of focus lenses driven in the direction of an optical axis to focus on a subject are mainly arranged in the focus section 10A. A group of zoom lenses driven in the direction of an optical axis to change the focal distance of the photographing lens 10 are arranged in the zoom section 10B. A diaphragm is arranged in the iris section 10C. A tracking lens driven to adjust the position of an image forming surface of the photographing lens 10 is arranged in the tracking section 10D.

The focus lens, zoom lens, diaphragm, and tracking lens, arranged in the sections 10A to 10D, are connected to motors for drive units 14A to 14D installed in, for example, the lens barrel of the photographing lens 10. These lenses are thus driven by the respective motors. The drive units 14A to 14D are connected to respective predetermined terminals of a control unit 16 using cables or the like. The motors for the drive units 14A to 14D are driven by driving signals provided by the control unit 16. Accordingly, the focus lens, the zoom lens, the diaphragm, and the tracking lens are driven in accordance with driving signals from the control unit 16.

The control unit 16 is a device containing circuits which execute processes such as auto focusing and tracking adjustment, which will be described later in detail.

A video signal output terminal 12A of a camera main body 12 is connected to a predetermined terminal of the control unit 16 using a cable or the like. The control unit 16 is thus provided with a video signal obtained by an image pickup element of the camera main body 12 by photoelectrically converting an image formed by the photographing lens. When performing a focusing operation using an auto focus function, the control unit 16 executes a contrast-based auto focus process to drive the focus lens or the tracking lens on the basis of the video signal as described later in detail.

A control terminal 12B of the camera main body 12 is connected to another terminal of the control unit 16 using a cable or the like. The control unit 16 is supplied with power by the camera main body 12 and transmits and receives various signals to and from the camera main body 12.

Focusing and zooming of the photographing lens 10 can be manually operated using a focus controller 18 and a zoom controller 20 connected to respective predetermined terminals of the control unit 16. The control unit 16 is provided with instruction signals based on operations of manual operation members provided on the focus controller 18 and zoom controller 20. On the basis of the instruction signals provided by the controllers 18 and 20, the control unit 16 drives the focus lens or the zoom lens to enable manual focus and zoom operations. It is also possible to manually operate the diaphragm or the tracking lens using a corresponding controller.

A display 22 is connected to a predetermined terminal of the control unit 16. The display shows information on a presently set focus position and information on a pre-stored desired focus position. The display 22 may be, for example, a commercially available portable computer instead of one exclusively used for the present system.

Figure 2:
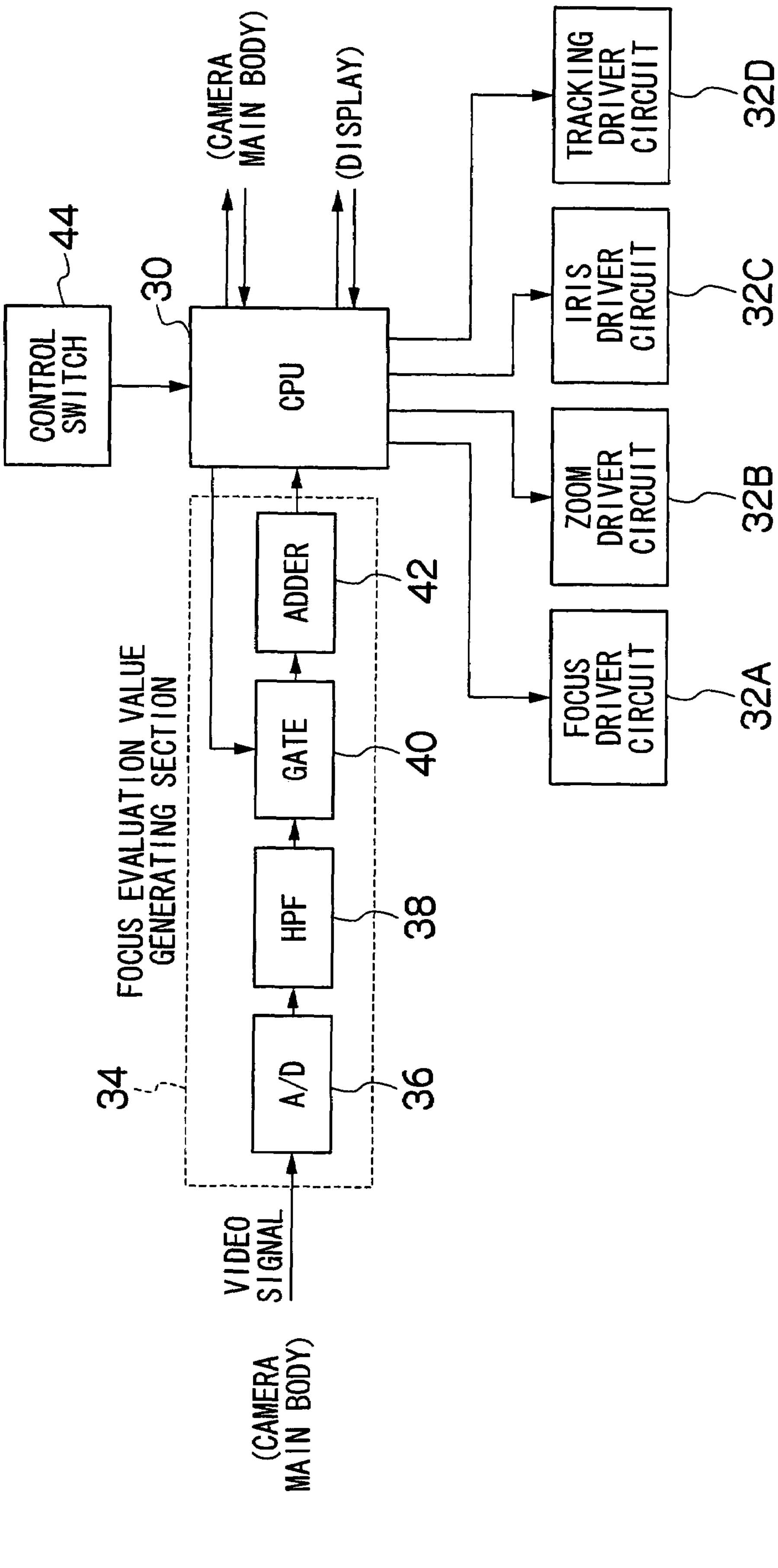
FIG. 2 is a block diagram showing the configuration of a control unit according to the first embodiment of the present invention.

FIG. 2 is a block diagram showing an arrangement associated with an auto focus process and a tracking adjusting process in the above system. A CPU 30, shown in this figure, is built into the control unit 16. The CPU 30 provides driving signals to a focus driver circuit 32A, a zoom driver circuit 32B, an iris driver circuit 32C, and a tracking driver circuit 32D mounted in the drive units 14A to 14D, respectively. The motors for the drive units 14A to 14D are thus driven by the respective driver circuits 32A to 32D on the basis of the driving signals from the CPU 30.

Various signals are transmitted between the CPU 30 and the control terminal 12B of the camera main body 12 and between the CPU 30 and the display 22. On the other hand, a video signal provided to the control unit 16 from the video output terminal 12A of the camera main body 12 is inputted to a focus evaluation value generating section 34. A focus evaluation value used to evaluate the contrast of an image is thus generated and provided to the CPU 30.

The focus evaluation value generating section 34 is mainly composed of an A/D converter 36, a high pass filter (HPF) 38, a gate circuit 40, and an adder 42. A video signal inputted to the control unit 16 is first converted by the A/D converter 36 into a digital signal. Here, the video signal is a luminance signal indicative of luminance values for pixels constituting a screen. The video signal converted by the A/D converter 36 into the digital signal is then inputted into the high pass filter (HPF) 38 to extract a signal for a high frequency component. Then, the signal extracted by the HPF 38 is inputted to the gate circuit 40. Only the signals corresponding to the pixels within a focus area (for example, a central portion of the screen) set by a signal from the CPU 30 are extracted from the signal inputted to the gate circuit 40 and then inputted to the adder 42. Then, the adder 42 adds these signals together. This determines the sum of the values of the signals within the focus area contained in the signal for the high frequency component extracted by the HPF 38 from the vide signal. The resultant value is a focus evaluation value indicative of the contrast (sharpness) of the image within the focus area. The focus evaluation value is then provided to the CPU 30.

While referencing the focus evaluation value provided by the focus evaluation value generating section 34, the CPU 30 moves the focus lens (or tracking lens) to the maximum point of the focus evaluation value on the basis of a hill-climbing method. Specifically, the focus lens is moved in the direction in which the focus evaluation value increases. When the focus evaluation value indicates a decrease, the CPU 30 determines the position where the focus evaluation value switches from increase to decrease to be the maximum point (focus point). The CPU 30 then stops the focus lens at that position. This allows a subject within the focus area to be focused.

The control unit 16 is provided with a control switch 44 composed of a plurality of switches. The CPU 30 is provided with switch signals indicative of the state of each switch. The CPU 30 executes the process shown below on the basis of the switch state of the control switch 44.

Figure 3:
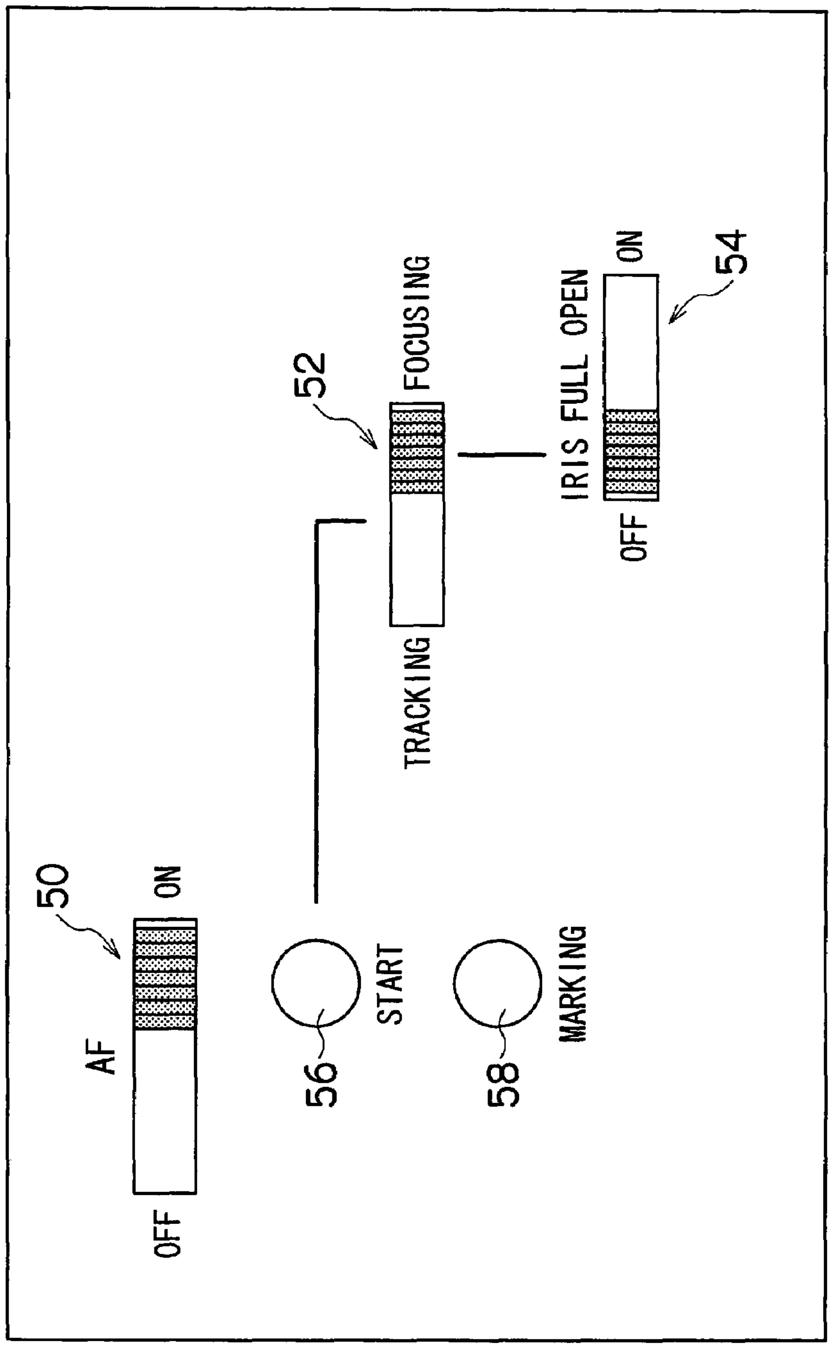
FIG. 3 is a diagram showing the configuration of a control switch according to the first embodiment of the present invention.

First, a process executed by the CPU 30 will be described in brief with reference to FIG. 3 showing the configuration of the control switch 44. In this figure, an AF switch 50 can be turned on and off. If the switch 50 is turned on, the auto focus function is enabled. If the switch 50 is turned off, the auto focus function is disabled. If the AF switch 50 is set to be off, the CPU 30 drives the focus lens or the like in accordance with, for example, a manual operation performed using the focus controller 18 or the like, shown in FIG. 1.

On the other hand, if the AF switch 50 is set to be on, the process is switched in accordance with the set state of a focusing switch 52 or a full open switch 54. If a start switch 56 is turned on, the process is started.

It is assumed that the AF switch 50 is on and the focusing switch 52 is set to a "FOCUSING" side (on). In this case, when the start switch 56 is turned on, the CPU 30 executes a focusing process. In the focusing process, one-shot auto focusing (one-shot AF) is executed. The one-shot AF is auto focusing that executes focusing only once. When the start switch 56 is turned on, the CPU 30 drives the focus lens on the basis of a focus evaluation value acquired from the focus evaluation value generating section 34 as described above. The CPU 30 then sets the focus lens at a focus position (the maximum point of the focus evaluation value). Once the focus lens is set at the focus position, the CPU 30 keeps the focus lens stopped at that position even if the focus evaluation value changes.

Although a specific process procedure will be described later, if the full open switch 54 has already been set to be on when one-shot AF is to be executed, the CPU 30 drives and sets the diaphragm to be open (full open). The CPU 30 then executes one-shot AF. Thus, auto focusing is executed with a small focal depth to achieve accurate focusing. On the other hand, if the full open switch 54 is set to be off, the process for opening the diaphragm is not executed. In the present embodiment, the one-shot AF is used in all cases. However, continuous AF may be used which continuously executes AF.

On the other hand, if the focusing switch 52 is set to a "TRACKING" side (off), when the start switch is turned on, the CPU 30 executes a process for tracking adjustment. A process procedure of tracking adjustment will be described later in detail. During tracking adjustment, a process similar to that of the one-shot AF is executed by driving the focus lens or the tracking lens. At this time, the diaphragm is unconditionally set to be open for accurate focusing.

If the diaphragm is set to be open in executing a process for focusing or tracking adjustment, the CPU 30 transmits a signal indicative of a full open mode to the camera main body 12 through the control terminal 12B (see FIG. 1). Thus, the camera main body 12 uses an ND filter, an electronic shutter, or the like to adjust exposure so that a video signal obtained if the diaphragm is open has an appropriate level. Then, once the exposure has been appropriately adjusted (or preparations for exposure adjustment have been appropriately achieved), the camera main body 12 transmits a full open instruction causing the diaphragm to be set to open, to the CPU 30 through the control terminal 12B. Normally, the diaphragm is controlled in accordance with a control signal provided by the camera main body 12. Accordingly, also in this case, on receiving a full open instruction from the camera main body 12, the CPU 30 sets the diaphragm to be open in accordance with this instruction. However, the camera main body 12 may recognize that the system is in the full open mode without receiving the full open instruction. Then, the CPU 30 may set the diaphragm to be open.

A marking switch 58 in FIG. 3 instructs on recording of a focus lens position (focus position). When the marking switch 58 is turned on, the CPU 30 acquires the present focus position and causes the display 22, shown in FIG. 1 to display the focus position. Specifically, as a value indicative of the present focus position (the focus position obtained when the marking switch 58 is turned on), for example, a value obtained by using a potentiometer to detect the position of the focus lens may be acquired from the drive unit 14A, shown in FIG. 1. However, in the present embodiment, the value indicative of the present focus position is a present focus control value set by the CPU 30 to indicate a movement target position when the CPU 30 outputs a driving signal to the drive unit 14A to move the focus lens to a desired position. Then, the CPU 30 transmits the present focus control value and a marking signal indicative of marking to be executed, to the display 22.

Figure 4:
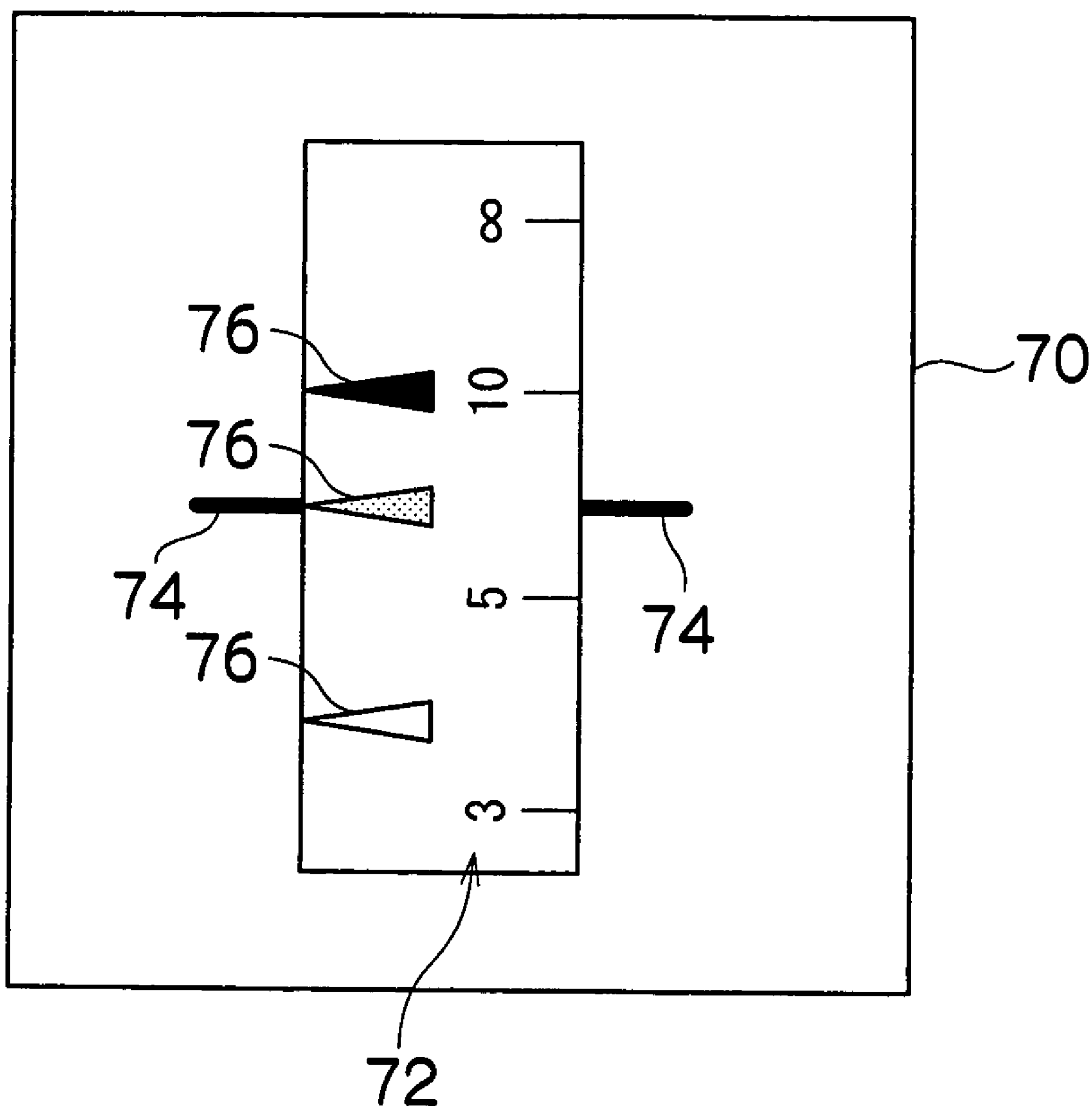
FIG. 4 is a diagram illustrating how a display displays information according to the first embodiment of the present invention.

FIG. 4 shows an example of display on a screen of the display 22. The screen 70 of the display 22 shows a scale 72 (in this figure, a scale indicative of about 3 m to ∞) for a photographing distance corresponding to the position of the focus lens as well as a bar-like indicator 74 indicative of the present focus position. The present focus position is varied by a focus control value sequentially provided by the CPU 30 as described above. The indicator 74 correspondingly moves on the screen and is then set at a scale value corresponding to the present focus position.

On the left of the scale 72, marks 76, 76, and 76 indicate a focus position (marking position) obtained when the marking switch 58 is used to instruct on marking. Specifically, the display 22 stores a focus control value provided by the CPU 30 together with a marking signal and displays a mark at a position on the screen corresponding to the focus control value. A plurality of marking positions may be set and the marks 76 are displayed in different colors. In this connection, instead of the colors of the marks 76, their shapes or the like may vary. Furthermore, the mark at the marking position remains displayed unless it is intentionally erased. It is also displayed during manual focusing when the AF switch 50 is off.

The present system is specialized for film making applications. In film making, test photographing is carried out before actual photographing to set photographing conditions for the photographing lens (optical system) 10 and the camera main body 12. On this occasion, as described above, auto focusing with the diaphragm set to be open is executed to focus on a subject at a distance similar to that used in actual photographing, and the focus position obtained is then marked. Subsequently, in actual photographing, the focus is set at this focus position. Then, videos in focus can be obtained. That is, during test photographing, focusing is carried out with a small focal depth compared to the set conditions for the diaphragm during actual photographing. Consequently, even if the distance to the subject during test photographing does not perfectly match that during actual photographing, videos in focus can be obtained.

The focus operation during actual photographing is normally performed manually. Accordingly, it is effective to turn on the marking switch 58 to record (mark) a focus position set by auto focusing during test photographing and then to allow the display 22 to show this focus position, as described above. During the actual photographing, by manually operating the focus while looking at the display 22 and setting the indicator 74 at the desired mark 76, displayed on the display 22, it is possible to easily and reliably reproduce the focus position set by auto focusing during the test photographing.

Alternatively, the display 22 may be used to control the focus. Alternatively, it is possible to set the focus lens at a specified marking position by performing a predetermined operation to specify that the focus is set at the focus position (marking position) of any of the desired marks 76 to transmit the corresponding instruction to the CPU 30.

Figure 5:
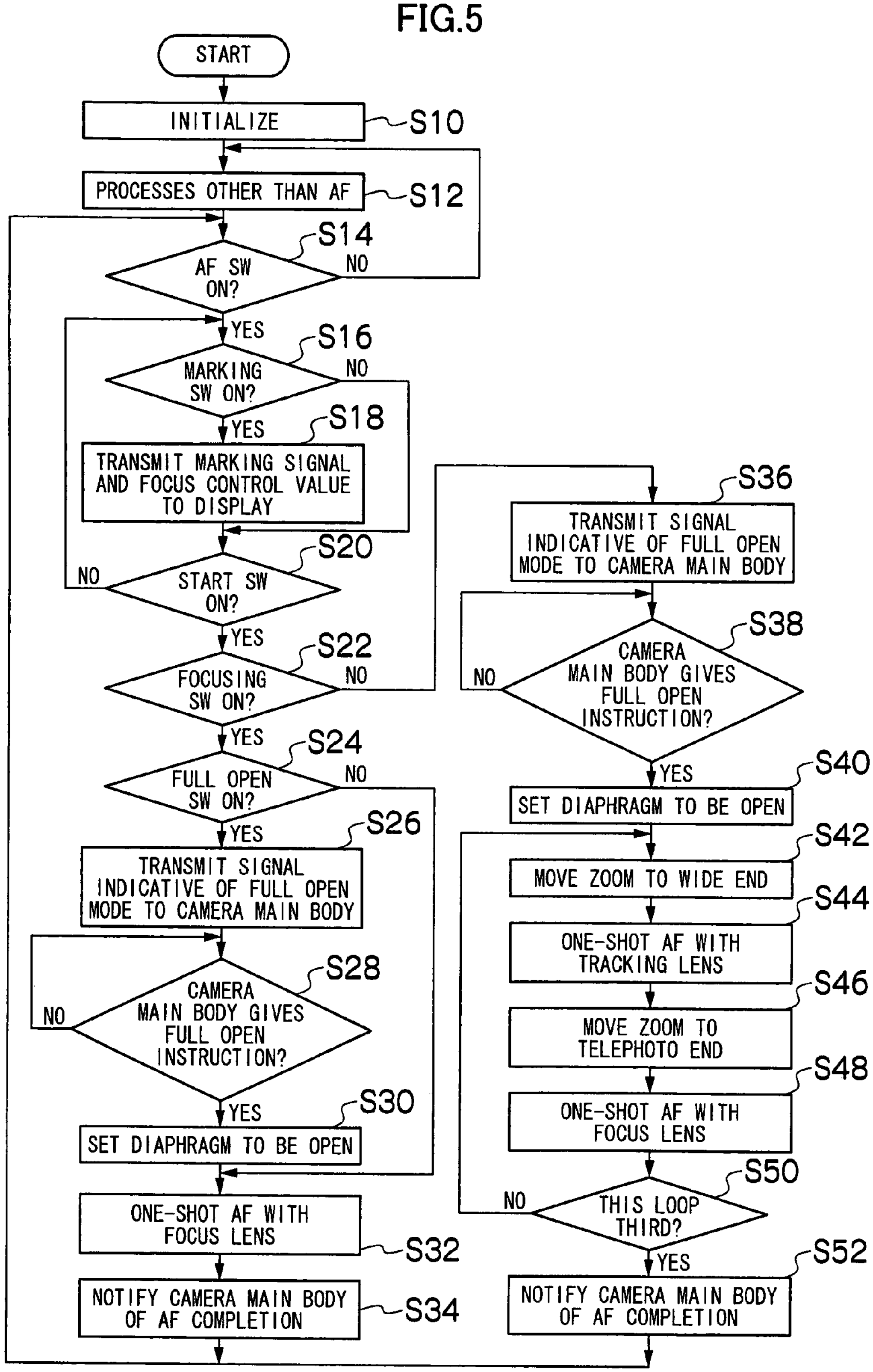
FIG. 5 is a flow chart showing a process procedure executed by a CPU according to the first embodiment of the present invention.

Next, a process procedure executed by the CPU 30 will be described with reference to the flow chart in FIG. 5. First, the CPU 30 executes a required initialization (step S1). The CPU 30 then executes processes other than auto focusing (including tracking adjustment) (step S12). Subsequently, it is determined whether or not the AF switch 50 is on (step S14). If the result of the determination is negative, the process returns to step S12. However, if the result of the determination is affirmative, the CPU 30 determines whether or not the marking switch 58 has been turned on (step S16). The marking switch 58 is commonly turned on after a focusing process has been executed. If the marking switch 58 has been turned on, the CPU 30 transmits a marking signal and the present focus control value to the display 22 (step S18). If the marking switch 58 has not been turned on, the processing in step S18 is not executed.

Then, the CPU 30 determines whether or not the start switch 56 has been turned on (step S20). If the result of the determination is negative, the process returns to step S16. However, if the result of the determination is affirmative, the CPU 30 subsequently determines whether or not the focusing switch 52 is set to be on (step S22). If the result of the determination is affirmative, the CPU 30 starts a focusing process. However, if the result of the determination is negative, the CPU 30 starts a tracking adjusting process.

If the result of the determination is affirmative at step S22 and the CPU 30 starts a focus processing, then it subsequently determines whether or not the full open switch 54 is set to be on (step S24). If the result of the determination is affirmative, the CPU 30 first transmits a signal indicative of a full open mode to the camera main body 12 (step S26). This causes the camera main body 12 to execute appropriate exposure adjustment for an open diaphragm. Then, the CPU 30 determines whether or not the camera main body 12 gives a full open instruction (step S28). While the result of the determination remains negative, the determination is repeated. Once the result becomes affirmative, the CPU 30 sets the diaphragm to be open (step S30). Then, the CPU 30 drives the focus lens to execute a one-shot AF process (step S32). Once focusing based on one-shot AF is completed, the CPU 30 notifies the camera main body 12 of the completion to cause the exposure adjustment, diaphragm, and the like in the camera main body 12 to return to their normal state (step S34).

If the result of the determination is negative at the above described step S24, the CPU 30 executes the process from step S32 without executing the diaphragm opening process from step S26 to step S30. Once the processing in step S34 is finished, the procedure returns to step S14.

If the result of the determination is negative at the above described step S22, that is, a tracking adjusting process is to be executed, the CPU 30 first transmits a signal indicative of the full open mode to the camera main body 12 (step S36). This causes the camera main body 12 to execute appropriate exposure adjustment for an open diaphragm. Then, the CPU 30 determines whether or not the camera main body 12 gives a full open instruction (step S38). While the result of the determination remains negative, the determination is repeated. Once the result becomes affirmative, the CPU 30 sets the diaphragm to be open (step S40).

Then, the CPU 30 drives the zoom lens to a zoom to a wide end (step S42). The CPU 30 then drives the tracking lens to execute a one-shot AF process (step S44). Specifically, the CPU 30 sets the tracking lens at a position where the focus evaluation value obtained from the focus evaluation value generating section 34 is maximum. Then, the CPU 30 moves the zoom to a telephoto end (step S46). The CPU 30 then drives the focus lens to execute a one-shot AF process (step S48). Once the processing in steps S42 to 48 is finished, the CPU 30 determines whether or not the process from step S42 to step S48 is the third (step S50). If the result of the determination is negative, the process from step S42 is repeated. However, if the result of the determination is affirmative, the CPU 30 notifies the camera main body 12 of the completion of AF to cause the exposure adjustment, diaphragm, and the like in the camera main body 12 to return to their normal state (step S52). Once the processing in step S52 is finished, the procedure returns to step S14.

(Second Embodiment)

With reference to the drawings, a detailed description will be given of a preferred embodiment of a focus information display apparatus according to the present invention.

Figure 6:
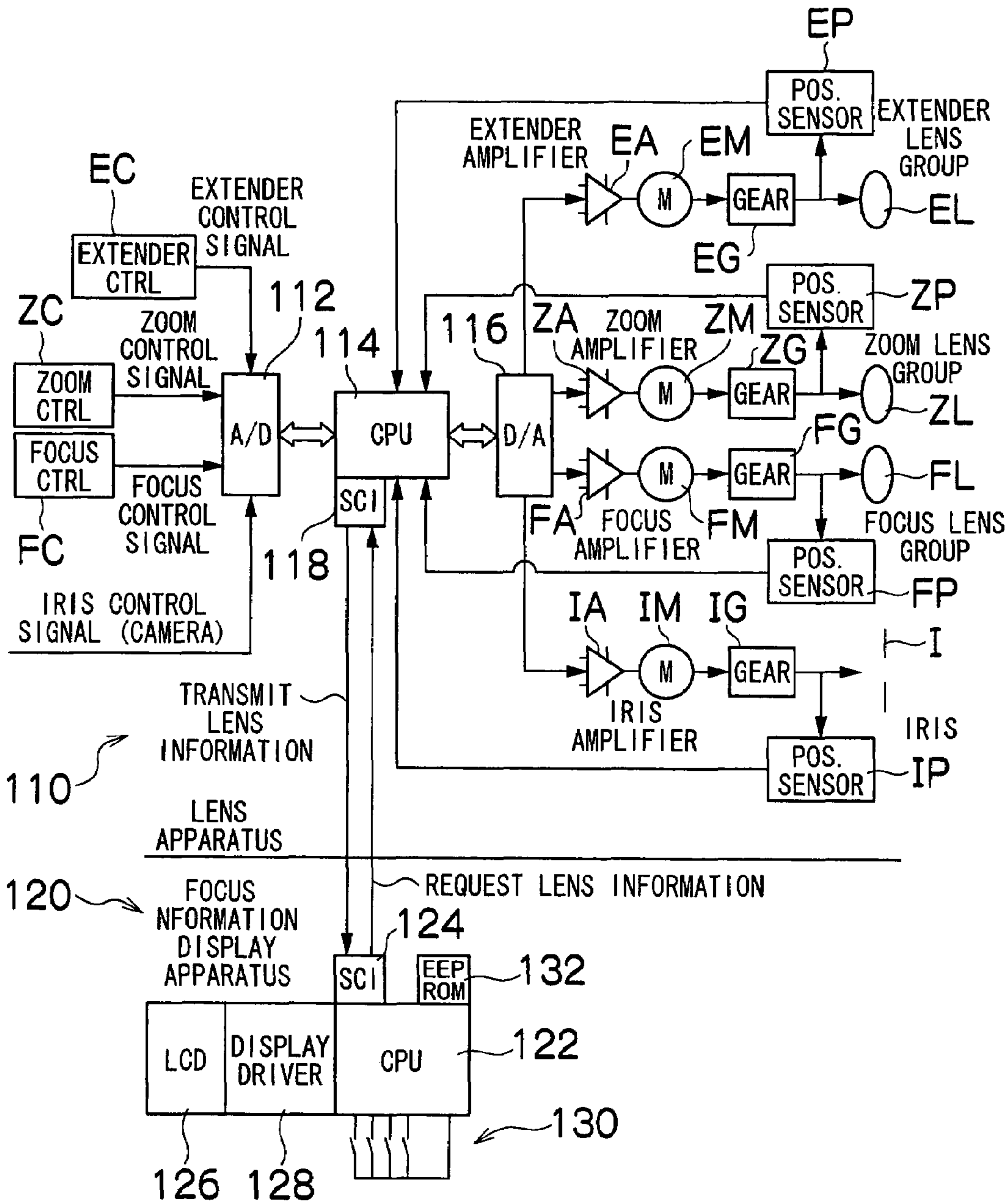
FIG. 6 is a control block diagram showing the whole configuration of a television lens system according to a second embodiment of the present invention.

FIG. 6 is a control block diagram showing the whole configuration of a television lens system to which the present invention is applied. First, description will be given of the configuration schematically shown in FIG. 6 and used in the television lens system. For example, optical parts such as a zoom lens (group) ZL, a focus lens (group) FL, an extender lens (group) EL, an iris I are arranged in a photographing optical lens (photographing lens) of a lens apparatus 110. The lens apparatus 110 is provided with a zoom motor ZM, a focus motor FM, an extender motor EM, and an iris motor IM in association with these optical parts.

The lens apparatus 110 is also provided with transmission mechanisms (gear trains) ZG, FG, EG, and IG which transmit power from the corresponding motors to the corresponding optical parts. If any of the motors is rotationally moved, the corresponding optical part is driven. For example, if the zoom motor ZM drives the zoom lens ZL, photographing magnifying power changes. When the focus motor FM drives the focus lens FL, a photographing distance (the distance to a subject to be focused) changes. When the extender motor EM drives the extender lens EL, the photographing magnifying power switches, for example, from 1 to 2 or from 2 to 1. When the iris motor IM drives the iris I, a diaphragm position (aperture diameter) changes.

On the other hand, the lens apparatus 110 is provided with a zoom control signal for zoom control, a focus control signal for focus control, and an extender control signal for extender control from a zoom controller ZC, a focus controller FC, and an extender controller EC, respectively. The lens apparatus 110 also receives an iris control signal for iris control inputted by a camera main body in which the lens apparatus 110 is installed. These control signals are, for example, analog signals and are converted into digital signals by an A/D converter 112 in the lens apparatus 110.

A CPU 114 is mounted in the lens apparatus 110. Control signals converted by the A/D converter 112 into digital signals are inputted to the CPU 114. The CPU 114 also receives position signals inputted by potentiometers ZP, FP, EP, and IP, respectively, and indicating the present positions of the zoom lens ZL, focus lens FL, extender lens EL, and iris I, respectively. On the basis of the control and position signals for the zoom, focus, extender, and iris, the CPU 114 outputs driving signals which drive the motors ZM, FM, EM, and IM so that the zoom lens ZL, the focus lens FL, the extender lens EL, and the iris I, respectively, move to their target positions or at their target speeds in accordance with the control signals.

Here, the zoom control signal generally instructs on the target speed of the zoom. The other control signals instruct on the target positions. The driving signals outputted by the CPU 114 instruct on the rotation speeds (including rotating directions) of the respective motors.

The driving signals outputted by the CPU 114 are converted by a D/A converter 116 into analog signals. The driving signal for the zoom motor ZM is inputted to a zoom amplifier ZA. The driving signal for the focus motor FM is inputted to a focus amplifier FA. The driving signal for the extender motor EM is inputted to an extender amplifier EA. The driving signal for the iris motor IM is inputted to an iris amplifier IA. The amplifiers ZA, FA, EA, and IA control voltages applied to the corresponding motors so that they achieve the rotation speeds corresponding to the inputted driving signals. Thus, the zoom lens ZL, the focus lens FL, the extender lens EL, and the iris I are set at the target positions or speeds specified by the respective control signals.

A focus information display apparatus 120 according to the present invention is connected to the lens apparatus 110 configured as described so as to, for example, be attached to and removed from a predetermined communication connector of the lens apparatus 110 using a cable. The focus information display apparatus 120 may be removably fixed to the lens apparatus 110 or the like using screws or the like. Alternatively, the focus information display apparatus 120 need not be manufactured so as to be exclusively used to display focus information but may be a commercially available computer, for example, a personal computer (notebook personal computer) or a mobile terminal. Moreover, a process executed by the focus information display apparatus 120 as described below may be carried out by the CPU 114 in the lens apparatus 110 or the like to display relevant information on a display section installed in the lens apparatus 110 or the like or on a display screen such as a view finder.

Not only a CPU 122 but also an SCI (Serial Communication Interface) 124 are mounted in the focus information display apparatus 120 to enable communications with external equipment. An SCI 118 is also mounted in the lens apparatus 110 to enable communications with external equipment. Accordingly, when a communication connector of the focus information display apparatus 120 is connected to the communication connector of the lens apparatus 110 using a cable or the like, various signals are transmitted between the CPU 122 of the focus information display apparatus 120 and the CPU 114 of the lens apparatus 110 by communications. A communication device used between the focus information display apparatus 120 and the lens apparatus 110 need not be based on wires but may be based on radio. Any communication method may be used.

The CPU 114 of the lens apparatus 110 uses the potentiometer FP to sequentially detect the present position of the focus lens FL (the position of the focus lens FL will hereinafter referred to as the focus position). Information (value) indicative of the detected focus position is sequentially transmitted to the CPU 122 of the focus information display apparatus 120 using the above described communication device. Instead of the actual position of the focus lens FL detected by the potentiometer FP, a target position indicated by a focus operation signal from the focus controller FC may be transmitted to the CPU 122 of the focus information display apparatus 120 as information on the present focus information.

The CPU 122 of the focus information display apparatus 120 displays a focus information screen on an LCD panel 126 via a display driver 128, the screen showing the present focus position and the like. The CPU 122 also sequentially updates the focus information screen on the basis of information on the focus position sequentially received from the lens apparatus 110.

Alternatively, the operator may switch the contents of information displayed on the LCD panel 126 or the display form using a predetermined switch in an operation switch section 130 arranged in the focus information display apparatus 120.

The focus information display apparatus 120 is also provided with a marking function of storing a desired focus position specified by the user, as a marking position (focus stored position) and displaying the relationship between the marking position and the present focus position. When the predetermined switch (memo switch) in the operation switch section 130 is depressed, the CPU 122 of the focus information display apparatus 120 causes an EEPROM 132 to store the present focus position as a marking position. Then, the CPU 122 causes the stored marking position to be displayed on the LCD panel 126 as described later.

Figure 7:
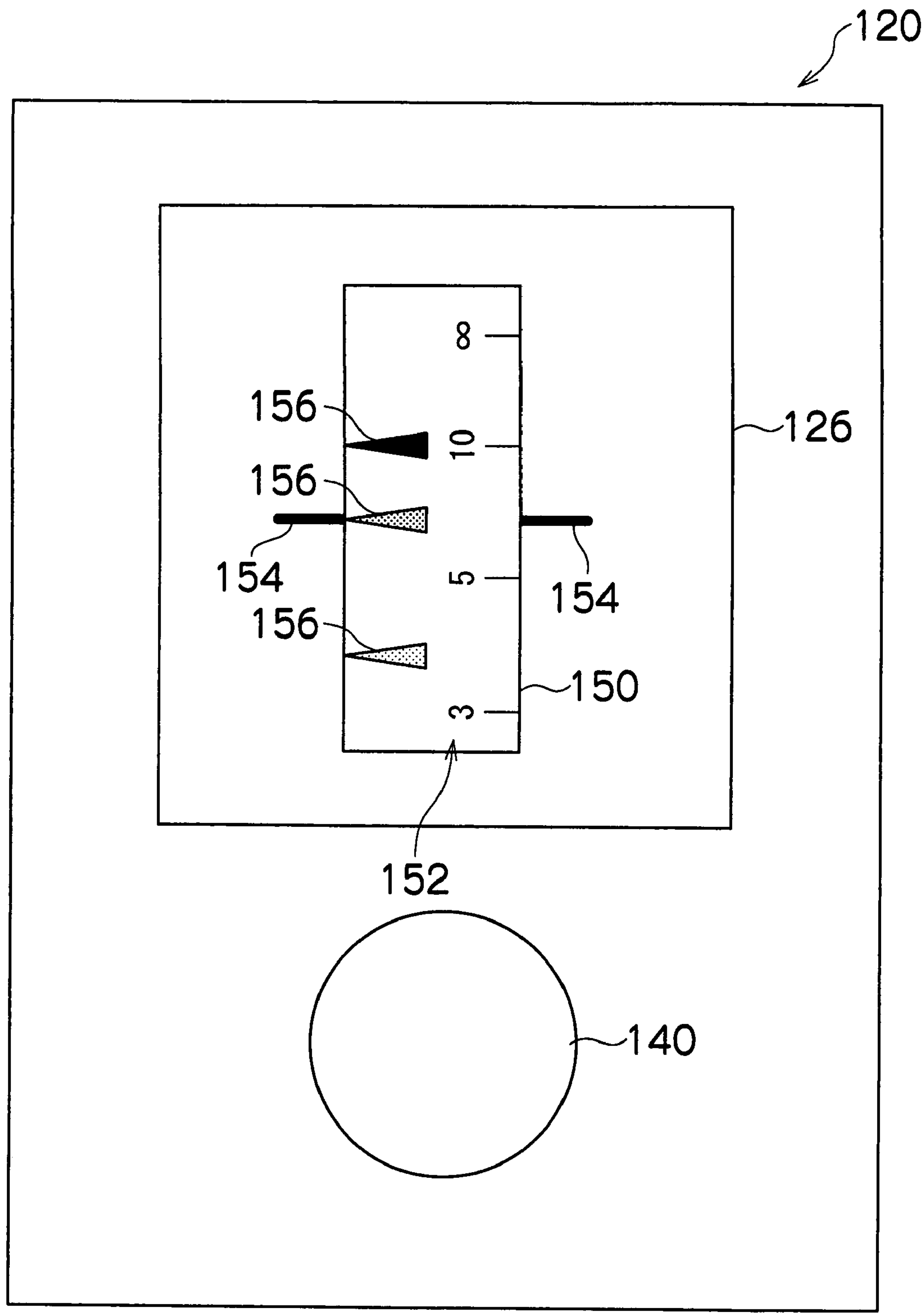
FIG. 7 is a simplified front view showing the appearance of a focus information display apparatus according to the second embodiment of the present invention.

Now, with reference to the front view in FIG. 7, schematically showing the appearance of the focus information display apparatus 120, a detailed description will be given of a process executed by the focus information display apparatus 120 to display focus information. As shown in FIG. 7, the LCD panel 126, the memo switch 140, and the like are disposed on the front of the focus information display apparatus 120. The memo switch 140 is used to instruct on the storage of the present focus position. For example, when the focus is set at a desired focus position by a manual focus operation using the focus controller FC and then the memo switch 140 is depressed, the present focus position is stored as a marking position.

The CPU 122 sequentially acquires information indicative of the present focus position from the lens apparatus 110. The focus position stored in the EEPROM 132 as a marking position when the memo switch 140 is depressed may be information on the focus position acquired from the lens apparatus 110 immediately before or after the depression of the memo switch 140. Alternatively, if the memo switch 140 is depressed, the information on the focus position may correspondingly be acquired from the lens apparatus 110. Then, this position may be stored in the EEPROM 132 as a marking position.

The stored focus position is not limited to the one set by a manual focus operation using the focus controller FC as described above. For example, a focus position set by an auto focus device (not shown) may be stored by depressing the memo switch 140.

FIG. 7 shows an example of display of focus information in a screen of the LCD panel 126. This screen shows a rectangular window frame 150 and a scale plate 152 displayed within the window frame 150 to show a value (in this figure, 3 m to ∞) for the focus position (a photographing distance corresponding to the position of the focus lens FL). Bar-like indicators 154, 154 are displayed outside the window frame 150 at its respective sides. The display of the scale plate 152 is moved up or down so that a position on the scale plate 152 which corresponds to the present focus position matches the position of the indicators 154, 154. Specifically, the CPU 122 moves the display of the scale plate 152 up or down within the window frame 150 in accordance with a variation in the value for the present focus position sequentially acquired from the lens apparatus 110, so as to match the position on the scale plate 152 corresponding to the present focus position, to the indicators 154.

Marking positions stored in the EEPROM 132 by operating the memo switch 140 are shown by marks 156, 156, 156 on the left of the scale plate 152. A plurality of marking positions can be stored and the marks 156 are displayed in different colors. Instead of being identified by colors, the marks 156 may be displayed in different forms or may be identified by adding different characters or symbols to them.

If for example, the focus controller FC is operated to focus on a pre-stored predetermined marking position, when the present focus position approaches the marking position, the mark 156 corresponding to this marking position switches from lighting display (always lighted) to blinking display. Specifically, the CPU 122 switches the mark 156 from lighting display to blinking display when the difference (absolute value) between the value indicative of the present focus position sequentially acquired from the lens apparatus 110 and the value stored in the EEPROM 132 and indicating the marking position decreases below a predetermined threshold. The CPU 122 switches the mark 156 from blinking display to lighting display when the difference increases above the threshold. By thus varying the display state, it is possible to easily and reliably perform an operation of focusing on the pre-stored marking position. Alternatively, instead of switching the mark from lighting display to blinking display or from blinking display to lighting display, it is allowable to switch the indicator 154 from lighting display to blinking display or from blinking display to lighting display.

Now, description will be given of two aspects for the above threshold, used to determine how the marking position and the present focus position are close to each other.

In a first aspect, the threshold is fixed to an appropriate value taking the approximate focal depth, depth of field, and the like of the photographing lens into account. In particular, if the threshold is set at a small value, switching of the mark 156 from lighting display to blinking display does not indicate that the present focus position simply approaches the marking position but that the present focus position can now be considered to match the marking position. In this connection, the threshold may be set at zero as a limit value. Furthermore, only if the present focus position perfectly matches the marking position, the mark 156 at this marking position may switch from lighting display to blinking display.

In a second aspect, the focal depth or depth of field varying depending on the photographing conditions is taken into account. The threshold is variable, for example, it increases consistently with the focal depth. In this case, the following information is acquired from the lens apparatus: not only information on the focus information but also information such as the position of the zoom lens ZL or iris I which is required to determine the focal depth or depth of field of the photographing lens. Moreover, if the threshold is set taking the focal depth or the depth of field into account, it is contemplated that, for example, the threshold corresponds to the boundary above which the subject distance at the marking position does not fall within a range determined from the subject distance at the present focus position taking the depth of field into account. According to this aspect, if the mark 156 at the marking position has switched from lighting display to blinking display as described above, it can be determined that the subject that is in focus at the marking position is now almost in focus at the present focus position.

The main object to switch the display state of the mark 156 is to enable the operator to easily and accurately determine whether or not the present focus position matches the marking position. Basically, desirably, if the present focus position perfectly matches the marking position or is considered to match the marking position, the display state of the mark 156 is switched to notify the operator of the match.

Figure 8:
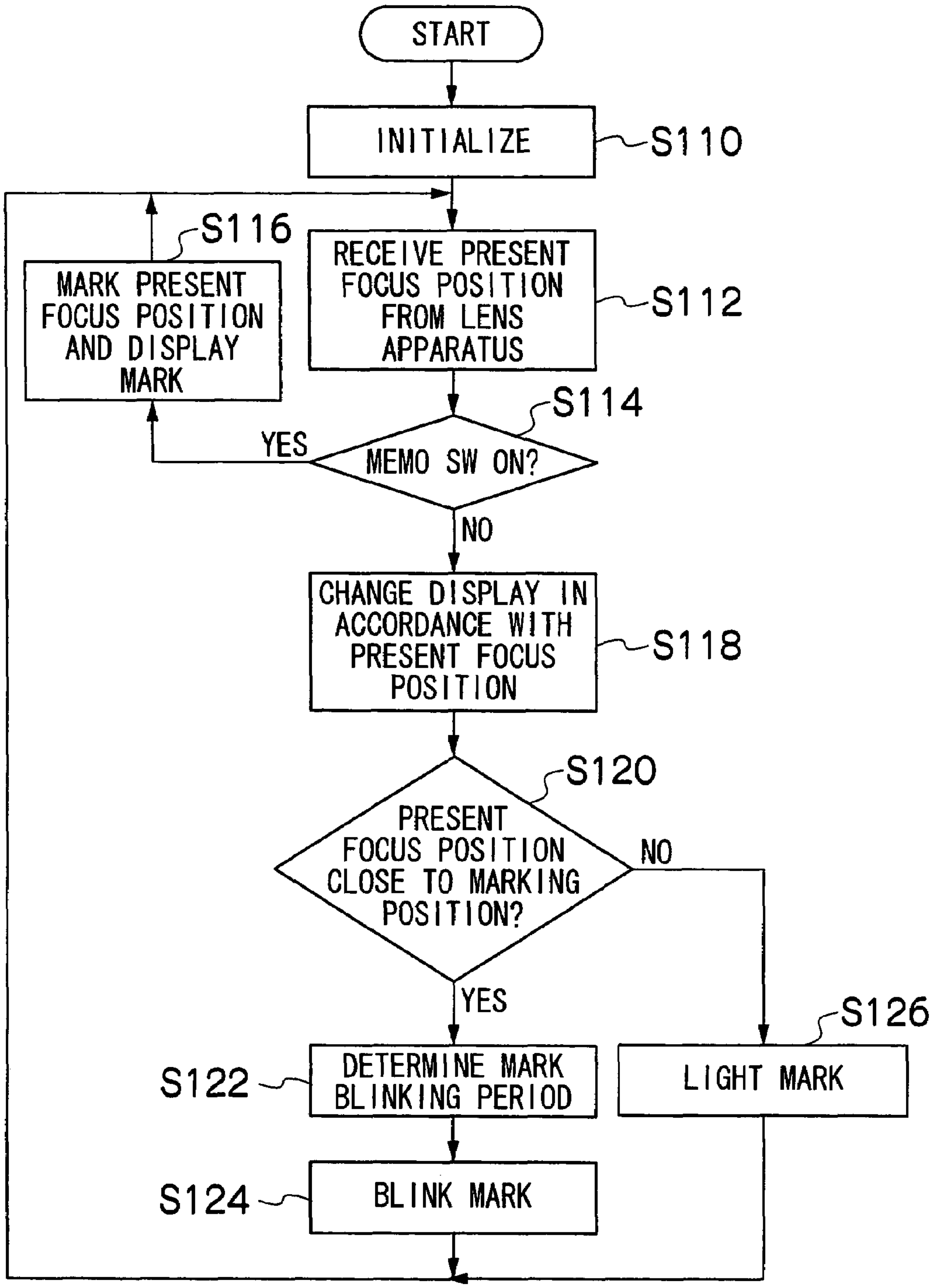
FIG. 8 is a flow chart showing a process procedure executed by a CPU of the focus information display device according to the second embodiment of the present invention.

With reference to the flow chart in FIG. 8, description will be given of a process procedure executed by the CPU 122 of the focus information display apparatus 120 in connection with the above display. First, the CPU 122 executes a required initialization (step S110). The CPU 122 then receives information on the present focus position from the lens apparatus 110 (step S112). Subsequently, the CPU 122 determines whether or not the memo switch 140 has been depressed (turned on) (step S114). If the result of the determination is affirmative, the CPU 122 causes the EEPROM 132 to store the present focus position received at step S112, as a marking position. The CPU 122 also causes the mark 156 to be displayed on the screen of the LCD panel 126 at a position on the scale plate 152 corresponding to the present focus position (step S116). Then, the procedure returns to step S114.

On the other hand, if the result of the determination is negative at step S114, the CPU 122 moves the display of the scale plate 152 up or down on the screen of the LCD panel 126 in accordance with the present focus position (step S118). Then, the CPU 122 determines whether or not the present focus position is close to any of the marking positions, that is, the difference between the value for the present focal position and the value for any of the marking positions is smaller than the threshold (step S120). If the result of the determination is affirmative, the CPU 122 determines a blinking period for the mark 156 (step 122). The CPU 122 then blinks the mark 156 using that period (step S124).

If the result of the determination is negative at step S120, the CPU 122 prohibits the mark 156 from being blinked and instead lights it (step S126). Once the processing in step S124 or S126 is finished, the procedure returns to step S114.

The above focus information display apparatus 120 can be particularly effectively used for film making. For example, in film making, test photographing is carried out before actual photographing. During the test photographing, the photographing conditions for the camera main body and photographing lens are adjusted. During the test photographing, for example, the manual focus function is used to focus on a subject standing at the same position as that used during actual photographing while referencing a large screen video monitor, a waveform monitor, or a focus information display apparatus (which displays focus information such as a front focus, a rear focus, and focusing). Alternatively, the auto focus function is used to achieve focusing. Then, the focus position obtained is stored in the focus information display apparatus 120 as a marking position. In manual focusing during actual photographing, the focus can be set easily and accurately at the marking position by referencing information displayed on the focus information display apparatus 120.

Figure 9:
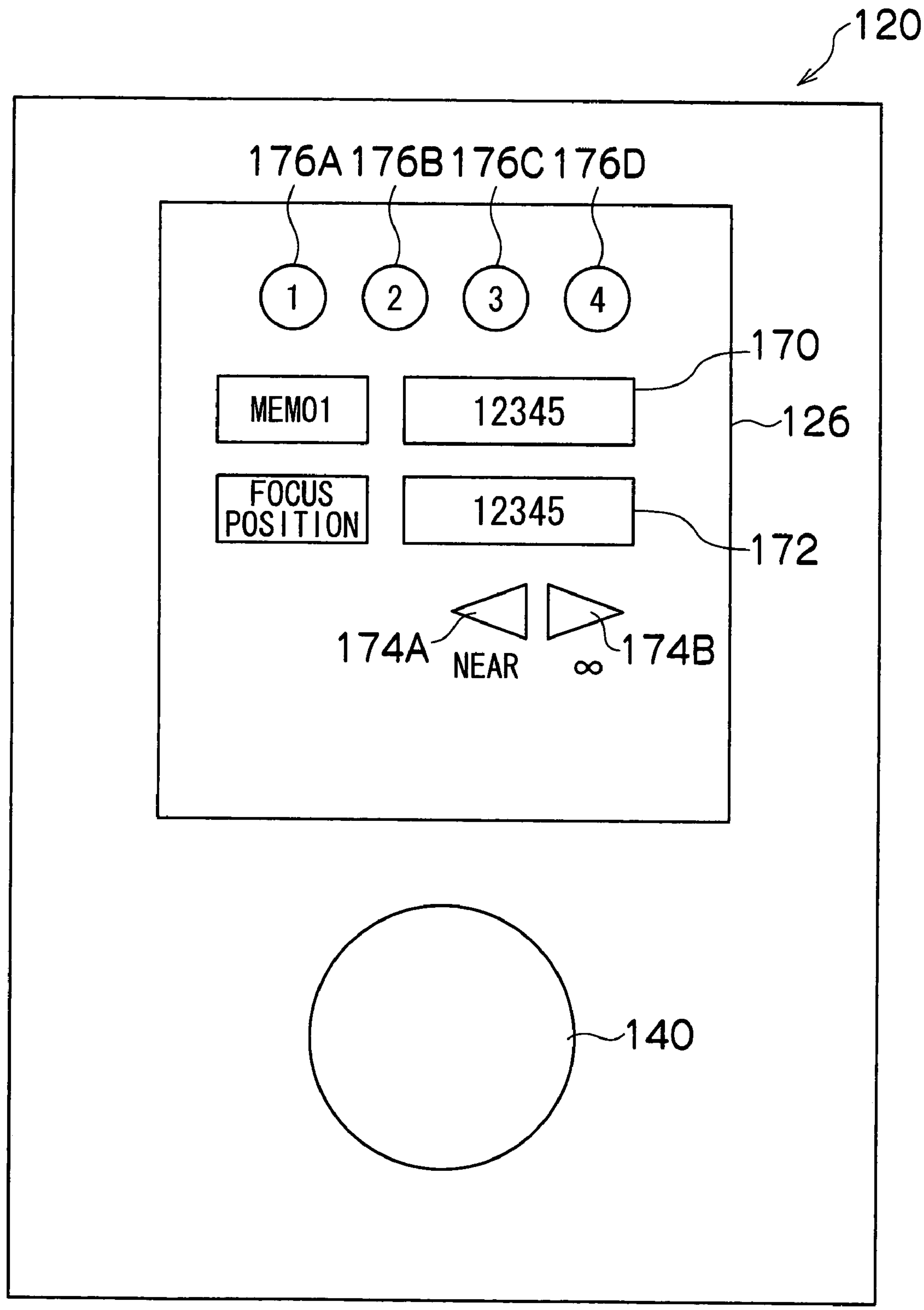
FIG. 9 is a front view showing another example showing how focus information is displayed on an LCD panel of the focus information display apparatus according to the second embodiment of the present invention.

Now, description will be given of an aspect for focus information displayed in the screen of the LCD panel 126 of the focus information display apparatus 120, the aspect being different from that shown in FIG. 7. FIG. 9 is a front view of the focus information display apparatus 120, showing an example of display of focus information. In this figure, the screen of the LCD panel 126 shows a marking position display window 170 in which the value for the stored marking position is displayed and a present position display window 172 in which the present focus position is displayed. The screen also shows direction indicators 174A and 174B which instruct on a focus operation direction used to match the present focus position to the marking position displayed in the marking position display window 170. Selection switches 176A to 176D with numbers 1 to 4, respectively, are also displayed which are used to select a desired marking position to be compared with the present focus position if a plurality of marking positions are stored.

The marking position display window 170 shows the value for the marking position selected using the selection switches 176A to 176D. The present position display window shows the value of the present focus position.

If the LCD panel 126 includes a touch panel, then directly touching a desired one of the selection switches 176A to 176D on the screen enables the corresponding marking position to be selected. Otherwise a selection can be made by performing a predetermined operation on the operation switch section 130.

In the illustrated example, the values displayed in the marking position display window 170 and present position display window 172 are focus control values used by the CPU 114 of the lens apparatus 110 or the CPU 122 of the focus information display apparatus 120 to recognize the focus position. However, the present invention is not limited to this aspect. These windows may show, for example, converted values for photographing distances (subject distances).

If the present focus position is on an infinity side with respect to the marking position displayed in the marking position display window 170, the direction indicator 174A instructing on a focus operation toward a close side is lighted to notify the operator of the need for this operation. On the other side the present position is toward a close side with respect to the marking position displayed on the marking position display window 170, the direction indicator 174B instructing on a focus operation on an infinity side is lighted in order to inform the operator of the need for this operation.

If the present focus position matches the marking position displayed in the marking position display window or approaches a position where it can be considered to match the marking position, both direction indicators 174A and 174B are lighted to notify the operator of the match. The direction indicators 174A and 174B may be switched from lighting display to blinking display when the present focus position approaches the marking position to some extent before both direction indicators 174A and 174B are allowed to light.

In the example of display of focus information in FIG. 7, the display state of the mark 156 at the marking position is switched to indicate whether or not the value for the present focus position has gotten close to the value for the marking position becomes small compared to the predetermined threshold. In the example of display of focus information in FIG. 9, the display state of the direction indicators 174A and 174B indicates the relationship between the present focus position and the marking position or whether or not the present focus position and the marking position are matched. However, the method of indicating how the present focus position is close to the marking position is not limited to the above ones, that is, the methods of indicating whether or not the present focus position and the marking position are matched (or can be considered to be matched) and whether or not the value for the present focus position has gotten close to the value for the marking position becomes small compared to the predetermined threshold.

For example, it is assumed that as the present focus position approaches the marking position until the former matches the latter, how the present focus position is close to the marking position is indicated by varying the display state of a predetermined character, symbol, or graphic on the screen of the LCD panel 26 or of the entire screen. The display state can be varied by varying the displayed color, the displayed luminance, the displayed form, or the type or font of the displayed character (or symbol or the like). Naturally enough, these variations may be combined. For example, both displayed color and displayed luminance may be varied or the displayed color and the displayed luminance may be sequentially varied.

In the above embodiments, as a focus position, the actual position of the focus lens FL in the focus information display apparatus 120 is stored and acquired. However, as a focus position, a target position in a focus operation signal or the like from the focus controller FC may be stored or acquired.

What is claimed is:

1. A lens control system having an auto focus device which drives a focus of a photographing lens for automatic focusing and a manual focus device which drives the focus of said photographing lens by manually operating a predetermined operation member, the system comprising:

an instructing device which instructs on recording of the focus position set by focusing executed by said auto focus device; and a focus recording position display device which displays the focus position the recording of which has been instructed on by said instructing device so that the focus position can be referenced when said manual focus device executes focusing.

2. The lens control system according to claim 1, wherein said focus recording position display device displays on a display screen that displays a present focus position, the focus position the recording of which has been instructed on by said instructing device and the present focus position so that it can be determined whether or not these focus positions are matched.

3. A focus information display apparatus which displays information on a focus of a photographing lens, the apparatus comprising:

a focus position storage device which stores a desired focus position of said photographing lens or a focus operation signal as a focus stored position;

a focus present position acquiring device which acquires a present focus position or a focus operation signal as a focus present position; and a display device which displays information indicating how said focus present position and said focus stored position are close to each other.

4. The focus information display apparatus according to claim 3, wherein said display device changes a display state of a predetermined character, symbol, or graphic when a difference between a value indicative of said focus present position and a value indicative of said focus stored position is smaller than a predetermined threshold.

5. The focus information display apparatus according to claim 4, wherein said threshold is set on the basis of a focal depth or a depth of field of said photographing lens.

6. The focus information display apparatus according to claim 4, wherein the displayed state is switched from lighting display to blinking display.

7. The focus information display apparatus according to claim 4, wherein the displayed state is switched from blinking display to lighting display.

8. The focus information display apparatus according to claim 4, wherein the predetermined threshold may be set at zero.

9. The focus information display apparatus according to claim 4, wherein the predetermined threshold varies consistent with at least one of a focal depth and a depth of field of the photographing lens.

10. A lens control system, comprising: an instruction device which instructs on recording a focus position to be stored; and a focus recording position display device which displays the focus position that has been instructed by the instructing device, wherein the stored focus position is obtained by an auto focus device or a manual focus device.

11. The lens control system according to claim 10, wherein the auto focus device drives a focus of a photographing lens for automatic focusing.

12. The lens control system according to claim 10, wherein the manual focus device drives a focus of a photographing lens by manually operating an operating member.

13. The lens control system according to claim 10, wherein the focus recording position display device displays on a display screen a present focus position and the recorded focus position to determine whether or not the present focus position and recorded focus position are a match.

14. The lens control system according to claim 13, wherein said display device changes a display state of a character, symbol, or graphic in which a difference between a value indicative of said focus present position and a value indicative of said focus stored position is smaller than a threshold.

15. The lens control system according to claim 14, wherein said threshold is set on the basis of at least one of a focal depth and a depth of field of said photographing lens.

16. The lens control system according to claim 10, wherein the displayed state is switched from lighting display to blinking display.

17. The lens control system according to claim 10, wherein the displayed state is switched from blinking display to lighting display.

18. The focus information display apparatus according to claim 3, wherein said display device changes a display state when a difference between a value indicative of said focus present position and a value indicative of said focus stored position is smaller than a predetermined threshold.

* * * * *